United States Patent [19]

Lubowitz et al.

[11] Patent Number: 4,871,475

[45] Date of Patent: * Oct. 3, 1989

[54] POLYSULFONE AND POLYETHERSULFONE OLIGOMERS

[75] Inventors: Hyman R. Lubowitz, Rolling Hills Estates, Calif.; Clyde H. Sheppard, Bellevue, Wash.

[73] Assignee: The Boeing Company, Seattle, Wash.

[ * ] Notice: The portion of the term of this patent subsequent to Oct. 9, 2004 has been disclaimed.

[21] Appl. No.: 785,364

[22] Filed: Oct. 7, 1985

[51] Int. Cl.[4] .......................... H01B 1/00; H01B 1/04
[52] U.S. Cl. .................... 252/500; 252/512; 252/518; 548/476; 548/547; 548/435; 528/170; 526/259; 526/262; 428/288; 524/80; 524/439; 524/401
[58] Field of Search ........ 252/500, 512, 518; 548/455, 524, 435, 547, 476; 528/170, 172; 526/259, 260, 262; 428/288; 524/80, 439, 401

[56] References Cited

U.S. PATENT DOCUMENTS

| | | | |
|---|---|---|---|
| Re. 29,316 | 7/1977 | Bargain et al. | 524/104 |
| 3,236,808 | 2/1966 | Goldberg et al. | 528/175 |
| 3,262,914 | 7/1966 | Goldberg | 528/173 |
| 3,265,708 | 8/1966 | Stiteler | 260/326.5 |
| 3,355,272 | 11/1967 | D'Alessandro | 51/298 |
| 3,453,236 | 7/1969 | Culbertson | 528/128 |
| 3,454,673 | 7/1969 | Schmidt et al. | 525/445 |
| 3,530,087 | 9/1970 | Hays | 523/435 |
| 3,536,670 | 10/1970 | Aelony et al. | 528/170 |
| 3,562,223 | 2/1971 | Baragain et al. | 528/322 |
| 3,563,951 | 2/1971 | Radlmann et al. | 528/951 |
| 3,631,222 | 12/1971 | Voget et al. | 525/419 |
| 3,641,207 | 2/1972 | Lauchlan | 525/68 |
| 3,652,710 | 3/1972 | Holub et al. | 525/397 |
| 3,658,938 | 4/1972 | Kwiatkowski et al. | 525/436 |
| 3,663,507 | 3/1972 | Vogel | 528/173 |
| 3,699,075 | 10/1972 | Lubowitz et al. | 528/172 |
| 3,708,439 | 1/1973 | Sayigh et al. | 528/186 |
| 3,729,446 | 4/1973 | Holub et al. | 526/262 |
| 3,761,441 | 9/1973 | D'Alessandro | 528/172 |
| 3,763,101 | 10/1973 | Jones | 528/171 |
| 3,770,697 | 11/1973 | Holub et al. | 528/170 |
| 3,773,718 | 11/1973 | Klebe et al. | 528/170 |
| 3,787,363 | 1/1974 | Staniland et al. | 528/174 |
| 3,803,081 | 4/1984 | Lubowitz | 524/538 |
| 3,812,159 | 5/1974 | Lubowitz et al. | 549/24 |
| 3,839,287 | 10/1974 | Kwiatkowski | 528/172 |
| 3,879,349 | 4/1975 | Bilou et al. | 528/127 |
| 3,897,393 | 7/1975 | Lu | 528/170 |
| 3,897,395 | 7/1975 | D'Alelio | 528/322 |
| 3,920,768 | 11/1975 | Kwiatkowski | 525/421 |
| 3,935,167 | 1/1976 | Marvel et al. | 528/125 |
| 3,956,320 | 5/1976 | Heath et al. | 549/241 |
| 3,957,862 | 5/1976 | Heath et al. | 562/468 |
| 3,972,902 | 8/1976 | Heath et al. | 549/241 |
| 4,005,134 | 1/1977 | Markezich | 562/473 |
| 4,020,069 | 4/1977 | Johnson et al. | 562/473 |
| 4,060,515 | 11/1977 | D'Alelio | 528/125 |
| 4,064,289 | 12/1977 | Yokoyama et al. | 427/82 |
| 4,097,456 | 6/1978 | Bane | 526/75 |
| 4,100,137 | 7/1978 | Lemieux et al. | 525/154 |
| 4,100,138 | 7/1978 | Bilou et al. | 526/262 |
| 4,101,488 | 7/1978 | Ishizuka | 524/592 |
| 4,107,153 | 8/1978 | Akiyama et al. | 528/322 |
| 4,108,837 | 8/1978 | Johnson et al. | 528/126 |
| 4,108,926 | 8/1978 | Arnold et al. | 525/534 |
| 4,115,231 | 9/1978 | Darms et al. | 204/159.22 |
| 4,116,937 | 9/1978 | Jones et al. | 528/170 |
| 4,126,619 | 11/1978 | Darms et al. | 548/435 |
| 4,128,574 | 12/1978 | Markezich et al. | 562/473 |
| 4,166,168 | 8/1979 | D'Alelio | 526/259 |
| 4,168,366 | 9/1979 | D'Alelio | 525/426 |
| 4,175,175 | 11/1979 | Johnson et al. | 528/125 |
| 4,176,223 | 11/1979 | Irwin | 528/170 |
| 4,179,551 | 12/1979 | Jones et al. | 526/262 |
| 4,183,839 | 1/1980 | Gaglinani | 524/719 |
| 4,189,560 | 2/1980 | Roth et al. | 526/259 |
| 4,197,397 | 4/1980 | D'Alelio | 528/222 |
| 4,239,883 | 12/1980 | Stenzenberger | 528/170 |
| 4,251,418 | 2/1981 | Chow et al. | 524/104 |
| 4,251,419 | 2/1981 | Heilman et al. | 524/104 |
| 4,255,313 | 3/1981 | Antonoplos et al. | 524/104 |
| 4,269,961 | 5/1981 | Jones et al. | 526/262 |
| 4,273,916 | 6/1981 | Jones | 528/117 |
| 4,288,607 | 9/1981 | Biek et al. | 560/11 |
| 4,293,670 | 10/1981 | Robeson et al. | 525/436 |
| 4,297,472 | 10/1981 | Heiss | 528/84 |
| 4,297,474 | 10/1981 | Williams, III et al. | 528/170 |
| 4,298,720 | 11/1981 | Yamazaki et al. | 526/262 |
| 4,299,750 | 11/1981 | Antonoplos et al. | 526/285 |
| 4,414,269 | 11/1983 | Lubowitz et al. | 428/290 |
| 4,476,184 | 10/1984 | Lubowitz et al. | 428/288 |
| 4,536,559 | 8/1985 | Lubowitz et al. | 428/290 |
| 4,654,410 | 3/1987 | Kashwaine et al. | 528/171 |

FOREIGN PATENT DOCUMENTS

| | | |
|---|---|---|
| 2246026 | 3/1973 | European Pat. Off. . |
| 0067976 | 12/1982 | European Pat. Off. . |
| 3421949 | 1/1985 | European Pat. Off. . |
| 0148543 | 7/1985 | European Pat. Off. . |
| 0187348 | 7/1986 | European Pat. Off. . |
| 0243833 | 11/1987 | European Pat. Off. . |
| 0244167 | 11/1987 | European Pat. Off. . |
| 8171068 | 6/1981 | Japan . |
| 2002378 | 4/1983 | United Kingdom . |

OTHER PUBLICATIONS

Sheppard, C. H., House, E. E. and Stander, M., "Advanced Thermoplastic Composites Development", 38th (List continued on next page.)

*Primary Examiner*—Josephine Barr
*Attorney, Agent, or Firm*—John C. Hammar

[57] ABSTRACT

Polysulfone and polyethersulfone oligomers are made by the condensation of phenols and halogenated moieties and exhibit improved solvent resistance when capped with crosslinkable end cap imidophenols. Composites made with a blend of the oligomers and corresponding polymers formed from the phenols and halogenated moieties, but without end caps, exhibit superior impact resistance while retaining the desired solvent resistance. Conductive or semiconductive oligomers (or their composites) can be formed by doping suitable oligomers, especially those prepared from Schiff base diols.

15 Claims, No Drawings

OTHER PUBLICATIONS

Annual Conference, Reinforced Plastics Composites Institute, The Society of the Plactics Industry, Inc., Feb. 16–20, 1981.

Sheppard, C. H. & House, E. E., "Development of Modified Polysulfone Reins", Final Report on Contract N00019-C-0561, Boeing Aerospace Company, Seattle, Wash. 98124, Dec. 1981.

Jaquish, J., Sheppard, C. H., Hill, S. G., House, E. E., Symonds, W. A., "Graphite Reinforced Thermoplastic Composites", Final Report on Contract N00019-7-9-C-0203, Boeing Aerospace Company, Seattle, Wash., Aug. 1980.

POLYSULFONE AND POLYETHERSULFONE OLIGOMERS

REFERENCE TO RELATED INVENTION

This application relates to U.S. Pat. No. 4,476,184, issued Oct. 9, 1984, and to U.S. Pat. No. 4,536,559, issued Aug. 20, 1985, both to Hyman Lubowitz and Clyde Sheppard, and both assigned of record to The Boeing Company.

TECHNICAL FIELD

The present invention relates to a method for making polysulfone and polyethersulfone oligomers formed by the condensation of phenols and halogenated aromatic compounds and to conductive or semiconductive oligomers made by the process.

BACKGROUND ART

U.S. Pat. No. 4,476,184, incorporated by reference, discloses thermoplastic polysulfone oligomers having dimethyloxynadic (DONA) crosslinkable end caps to impart solvent-resistance to the cured resins. Similar oligomers having difunctional nadic, maleic, and phenylacetylenic end caps are disclosed in U.S. Pat. No. 4,536,559, which also is incorporated by reference.

SUMMARY OF THE INVENTION

Polysulfone and polyethersulfone oligomers, similar to those of U.S. Pat. No. 4,476,184, are prepared by the condensation of phenols and halogenated aromatic compounds. Solvent resistance is obtained in the cured resins by terminating the polymer chains with crosslinkable imidophenol end caps (E-OH) selected from the group consisting of:

wherein
$R_1$ = lower alkyl, lower alkoxy, aryl, aryloxy, substituted aryl, halogen, or mixture thereof;
$j$ = 0, 1, or 2;
$i$ = 1 or 2;
$G$ = —$CH_2$—, —O—, —S—, or —$SO_2$—; and
$k$ = 1 or 2.

The preferred solvent-resistant polysulfone and polyethersulfones are prepared by condensing the end caps with a mixture of aromatic difunctional phenolic (diols) and difunctional halogenated aromatic moieties (dihalogens), according to the reaction scheme:
2 moles of the end cap;
$n+1$ moles of the dihalogen; and
$n$ moles of the diol.

The dihalogen is preferably selected from the group consisting of:

wherein
X = halogen, preferably chlorine; and
$q$ = —S—, —$SO_2$—, —CO—, —$(CH_3)_2C$—, and —$(CF_3)_2C$—, and preferably either —$SO_2$— or —CO—.

The diols are preferably selected from the group consisting of:
hydroquinone;
bisphenol A;
P, P'—biphenol;
4, 4'—dihydroxydiphenylsulfide;
4, 4'—dihydroxydiphenylether;
4, 4'—dihydroxydiphenylisopropane;

4, 4'—dihydroxydiphenylhexafluoropropane;
HO—Ar—OH;
HO—Ar—L—Ar'—L—Ar—OH; and
HO—Ar'—L—Ar—L—Ar'—OH;
wherein
L=—CH₂—, —(CH₃)₂C—, —(CF₃)₂C—, —O—,
—S—, —SO₂—,
or —CO—;

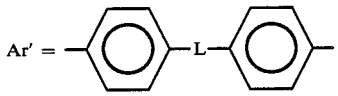

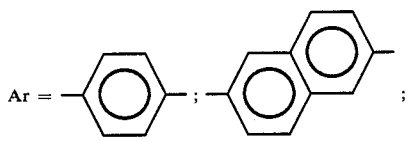

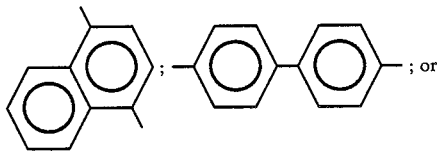

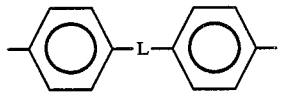

Ar and Ar' may include substituents on the aromatic groups, the substituents being selected from the group consisting of lower alkyl, lower alkoxy, aryl, aryloxy, substituted aryl, halogen, or mixtures thereof.

Conductive or semiconductive cured resins can be made by including conductive linkages (Schiff bases, oxazole, thiozole, or imidazole linkages, for example) in the backbone. In these circumstances suitable diols include compounds represented by Schiff bases, such as:

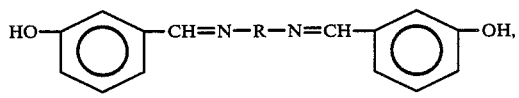

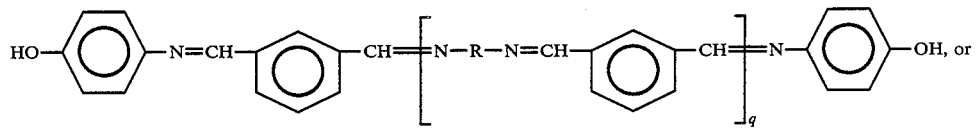

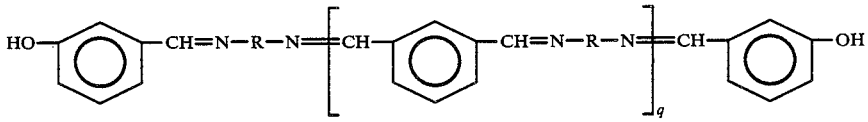

wherein
R is selected from the group consisting of:
phenyl;
biphenyl;
naphthyl; or
a compound of the general formula:

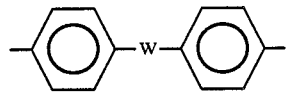

wherein
W=—CH₂— or —SO₂—; and
q=a small integer, preferably 5 or less, and, more preferably, 0 or 1.

The conductive or semiconductive resins and composites are prepared by including a suitable dopant within the cured composite. The dopant is added to the oligomer prior to curing.

Preferred capped oligomers have formula weights between about 1,000 and 40,000; preferably between about 5,000 and 30,000; and, more preferably, between about 10,000 and 20,000. An oligomer with a molecular weight lower than about 1,000 and probably have excessive crosslinking, will lose its thermoplastic properties and, will consequently, have the disadvantages associated with thermosetting resins. If the oligomer has a molecular weight of more than about 40,000, insufficient crosslinking probably will occur and the resulting resin will have inadequate solvent resistance, as with prior thermoplastic resins. Within about 1,000 to 40,000, the crosslinked compounds have beneficial properties of both thermoplastic and thermosetting resins without the disadvantages of either.

Impact resistance of the cured composites formed from prepregs of the oligomers can be increased without deleterious loss of solvent resistance by forming the prepregs with a blend of capped oligomers to provide crosslinking upon curing and uncapped polymers of the corresponding backbone to provide compatability of the oligomer and polymer. A 50-50 blend of an oligomer and a polymer (on a molar basis), can be formed by dissolving the capped oligomer in a suitable first solvent, dissolving the uncapped polymer in an aliquot of the first solvent or in a solvent miscible with the first solvent, mixing the two solvent solutions to form a lacquer, and applying the lacquer to fabric in a conventional prepregging process.

Composites of the oligomers and of the oligomer-polymer blends are prepared by curing the prepregs or resins in conventional vacuum bagging techniques.

BEST MODE CONTEMPLATED FOR THE INVENTION

Polysulfone and polyethersulfone oligomers are prepared by the condensation reaction of:

2 moles of a crosslinkable end cap imidophenol (E—OH);

n+1 moles of a difunctional halogenated aromatic moiety (dihalogen); and n moles of a difunctional phenol (diol), by mixing the reactants under an inert atmosphere, and heating the mixture, if necessary, to induce the reaction. Best results are achieved by mixing the phenol and diol (with or without a suitable solvent) to form a premix, and adding the premix to the dihalogen (dissolved in a compatible solvent, if necessary or desirable). The product has the general formula:

E—O—[(dihalogen)O(diol)]$_N$(dihalogen)O—E

Undesirable side reactions can be inhibited by including a base in the reaction mixture, generally selected from the group consisting of sodium or potassium carbonate or sodium or potassium hydroxide. The base buffers the reaction mixture by reacting with hydrogen ions evolved during the condensation. An excess of base (at least about 10% more than the theoretical molar quantity) should be used.

The end cap phenol (E—OH) preferably is selected from the group consisting of:

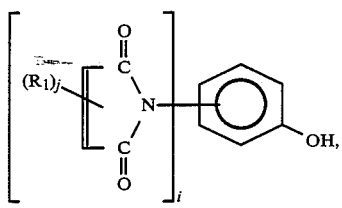

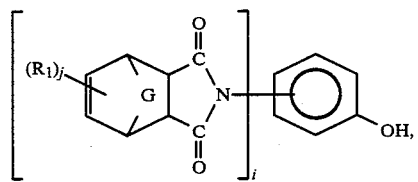

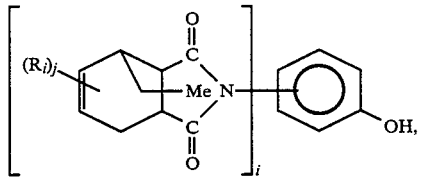

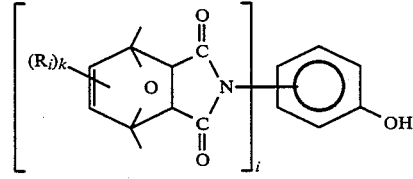

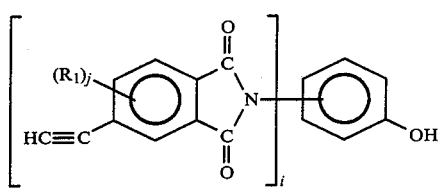

wherein $R_1$ = lower alkyl, lower alkoxy, aryl, aryloxy, substituted aryl, halogen, or mixture thereof;

j = 0, 1, or 2;

i = 1 or 2;

G = —CH$_2$—, —O—, —S—, or —SO$_2$—; and k = 1 or 2.

To obtain the highest thermal stability, the preferred end caps are:

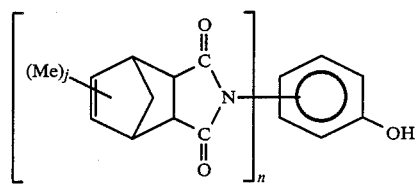

or

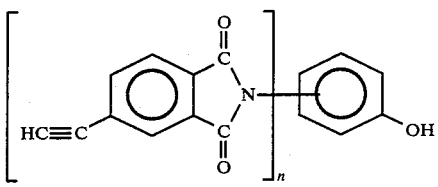

wherein n = 1 or 2 (preferably 2); and j = 0, 1, or 2.

The diol is preferably selected from the group consisting of:

hydroquinone;

bipshenol A;

p, p'—biphenol;

4, 4'—dihydroxydiphenylsulfide;

4, 4'—dihydroxydiphenylether;

4, 4'—dihydroxydiphenylisopropane;

4, 4'—dihydroxydiphenylhexafluoropropane;

HO—Ar—OH;

HO—Ar—L—Ar'—L—Ar—OH; and

HO—Ar'—L—Ar—L—Ar'—OH;

wherein

L = —CH$_2$—, —CH(CH$_3$)$_2$C—, —(CF$_3$)$_2$C—, —O—, —S—, —SO$_2$—, or —CO—;

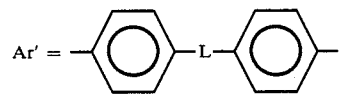

-continued

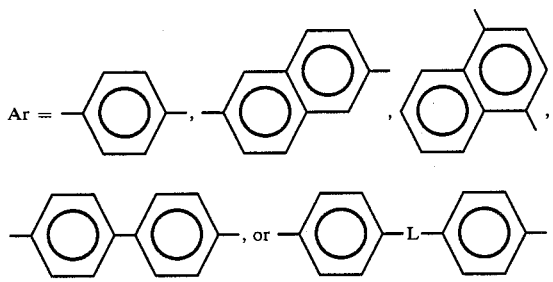

Ar and Ar' may include substituents selected from the group consisting of lower alkyl, lower alkoxy, aryl, aryloxy, substituted aryl, or mixtures thereof. Unsubstituted compounds are preferred to avoid steric hindrance, and for cost, convenience, and performance. Although the para isomer is illustrated, other isomers may be used.

To make semiconductive or conductive composites, diols including conductive linkages might be used. These diols are illustrated by Schiff base diols having the backbones:

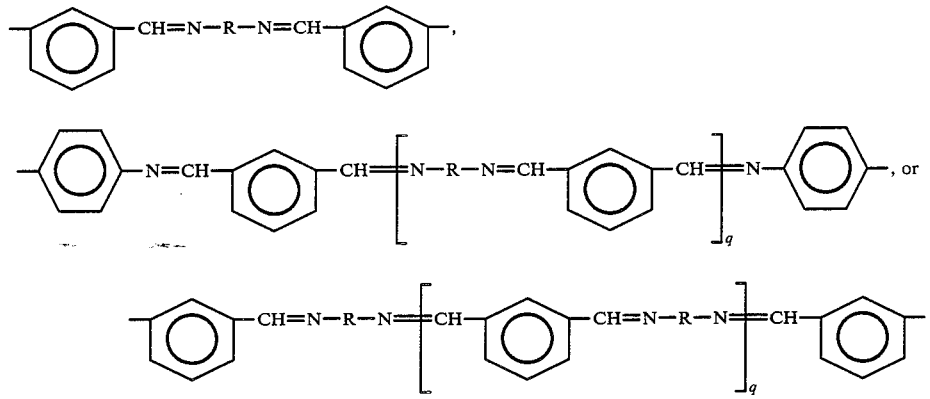

made by the condensation of amines and aldehydes, wherein
R is selected from the group consisting of:
  phenyl;
  biphenyl;
  naphthyl; or
  a compound of the general formula:

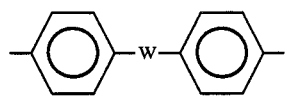

wherein
  W = —CH$_2$— or —SO$_2$—; and
  q = a small integer, preferably 5 or less, and, more preferably, 0 or 1.

Dopants for creating semiconductive or conductive composites are preferably selected from compounds commonly used to dope other polymers, namely, (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the polymers to form charge transfer complexes. N-type semiconductors result from doping with alkali metal dispersions. P-type semiconductors result from doping with elemental iodine or perchlorates.

While research into conductive or semiconductive polymers, has been intense, the resulting compounds (mainly polyacetylenes, polyphenylenes, and polyvinylacetylenes) are unsatisfactory for aerospace applications because the polymers are:
  (a) unstable in air;
  (b) unstable at high temperatures;
  (c) brittle after doping;
  (d) toxic because of the dopants; or
  (e) intractable.
These problems are overcome or significantly reduced with the conductive oligomers of the present invention.

The polymers of the present invention generally exhibit greater oxidative stability and greater dimensional stability at elevated temperatures, greater impact strengths, greater dimensional stiffness over a wide range of temperatures, and greater toughness than prior art conductive oligomers and composites.

While conventional theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiozole polymers, the oligomers of the present invention, include "sulfone" linkages interspersed along the backbone providing a mechanical swivel for the rigid, conductive segments of the arms. Phenoxyphenylsulfone or phenoxyphenylketone moieties are preferred. The resulting compounds are polyphenoxyphenylsulfoneimido polymers with condutive segments.

The conductive or semiconductive resins and composites are prepared by including a suitable dopant within the cured composite. The dopant is added to the oligomer prior to curing.

The dihalogen is preferably selected from the group consisting of:

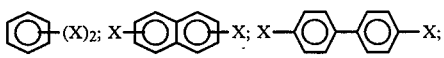

-continued

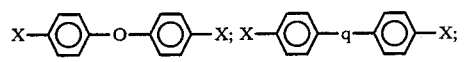

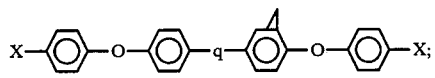

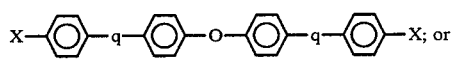

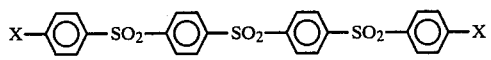

wherein X=halogen, preferably chlorine; and
q=—S—, —SO₂—, —CO—, —(CH₃)₂C—, and —(CF₃)₂C—, and preferably either —SO₂— or —CO—.

Again, other isomers of these compounds can be used.

Oligomers of this general type have curing temperatures of about 350°–600° F. (usually 400°–500° F.), but reduced curing temperature can be achieved when the oligomers are combined with coreactants in roughly equimolar amounts. The correactants improve the solvent resistance of the composites, but reduce the thermoplastic properties. Suitable coreactants are selected from the group consisting of:

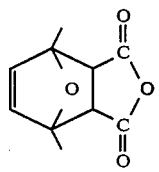

and

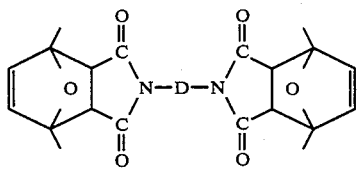

or similar compounds analogous to the oligomer imidophenol end cap,
where D is an alkyl having 2 to 6 carbon atoms or an aromatic radical such as:

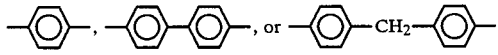

Impact resistance of the cured composites formed from prepregs of the oligomers can be increased without deleterious loss of solvent resistance by forming the prepregs with a blend of capped oligomers to provide crosslinking upon curing and uncapped polymers of the corresponding backbone to provide compatibility of the oligomer and polymer. A 50—50 blend on a molar basis of oligomer and polymer is preferably formed by dissolving the capped oligomer in a suitable first solvent, dissolving the uncapped polymer in a separate portion of the same solvent or in a solvent miscible with the first solvent, mixing the two solvent solutions to form a lacquer, and applying the lacquer to fabric in a conventional prepregging process.

Although the polymer in the blend usually has the same length backbone as the oligomer, the properties of the composite formed from the blend can be adjusted by altering the ratio of formula weights for the polymer and oligomer. Seemingly the terminal groups of the polymer are unimportant so long as these groups do not react with or impede the crosslinking of the oligomer end caps. Also, it is probably not essential that the oligomer and polymer have identical repeating units, but that the oligomer and polymer merely be compatible in the solution prior to sweeping out as a prepreg. Of course, if the polymer and oligomer have identical backbones, compatibility in the blend is likely to occur.

The polymers are made by the condensation of diols, as described above, and dihalogens, as described above, in a solution containing an excess of base (K₂CO₃, Na₂CO₃, KOH, or NaOH).

Composites of the oligomers and of the oligomer-polymer blends are prepared by curing the prepregs or resins in conventional vacuum bagging techniques. For example, the oligomers can be applied to a fiber cloth reinforcement, and the resulting prepreg can be cured in a vacuum bag process at an elevated temperature. Dopant should be added to the oligomer prior to prepregging, if conductive or semiconductive composites are being prepared.

While preferred embodiments have been described, those skilled in the art will readily recognize alterations, variations, and modifications which might be made without departing from the inventive concept. Therefore, the claims should be interpreted liberally with the support of the full range of equivalents known to those of ordinary skill based upon this description. The examples are given to illustrative the invention and not to limit it. The claims should be limited only as is necessary in view of the pertinent prior art.

We claim:
1. A method for preparing an oligomer, by condensing
   2 moles of an end cap imidophenol;
   n+1 moles of a dihalogen moiety; and
   n moles of a diol,
   wherein the imidophenol is selected from the group consisting of:

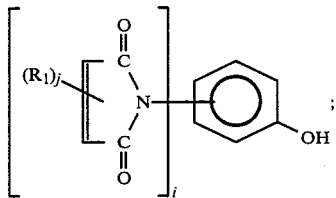

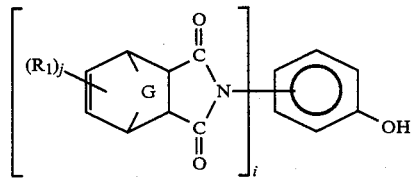

-continued

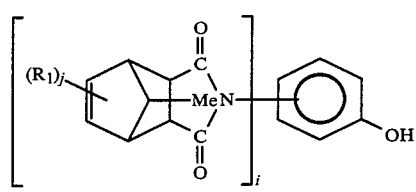

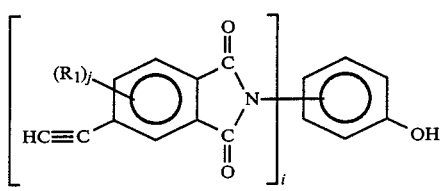

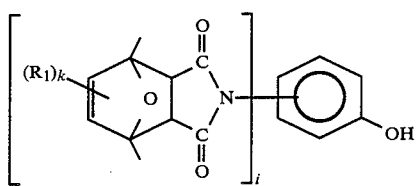

wherein
R₁=lower alkyl, lower alkoxy, aryl, aryloxy, substituted aryl, halogen, or mixtures thereof;
j=0, 1, or 2;
i=1 or 2;
G=—CH₂—, —O—, —S—, or —SO₂—; and
k=1 or 2;
wherein the dihalogen moiety is selected from the group consisting of:

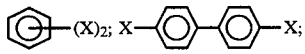

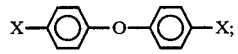

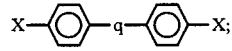

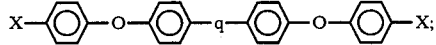

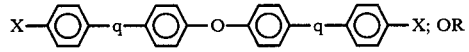

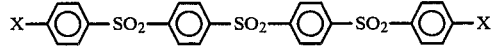

wherein
X=halogen; and
q=—S—, —SO₂—, —CO—, —(CH₃)₂C—, and —(CF₃)₂C—;
wherein the diol is selected from the group consisting of:
hydroquinone;
bisphenol A;
p, p'—biphenol;
4, 4'—dihydroxydiphenylsulfide;
4, 4'—dihydroxydiphenylether;
4, 4'—dihydroxydiphenylisopropane;
4, 4'—dihydroxydiphenylhexafluoropropane;
HO—Ar—OH;
HO—Ar—L—Ar'—L—Ar—OH; and
HO—Ar'—L—Ar—L—Ar'—OH;
wherein
L=—CH₂—, —(CH₃)₂C—, —(CF₃)₂C—, —O—, —S—, —SO₂—, or —CO—;

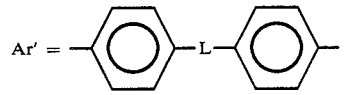

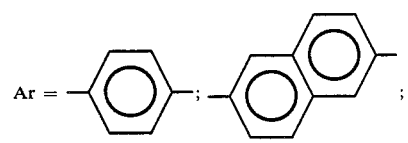

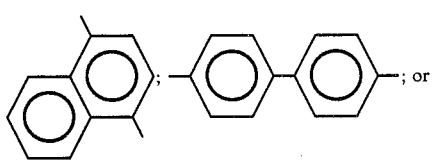

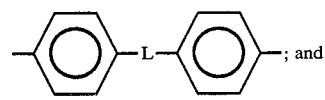

wherein n=an integer such that the oligomer has a formula wherein between about 1,000 and 40,000.

2. The product of the process of claim 1.

3. The method of claim 1 wherein the reaction occurs in the presence of an inert atmosphere at an elevated temperature and in the presence of an excess of base.

4. The method of claim 3 wherein the base is selected from the group consisting of K₂CO₃, Na₂CO₃, KOH, NaOH, or mixtures thereof.

5. The product of claim 2 wherein the end cap imidophenol is selected from the group consisting of:

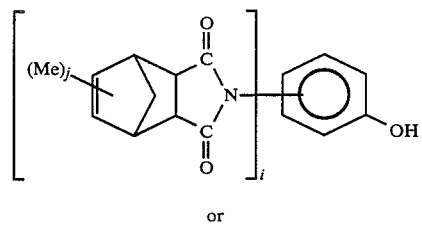

or

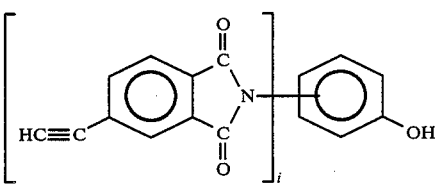

6. A conductive or semiconductive oligomer, comprising:
(a) the product of the process of condensing;
2 moles of an end cap imidophenol;
n+1 moles of a dihalogen moiety; and
n moles of a diol,
wherein the imidophenol is selected from the group consisting of:

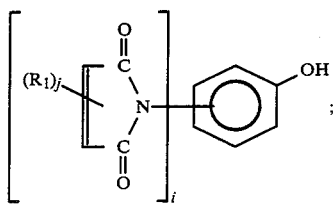

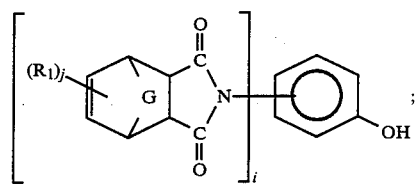

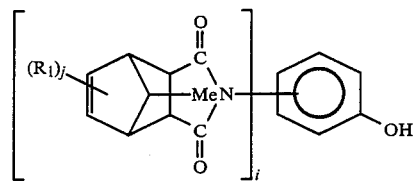

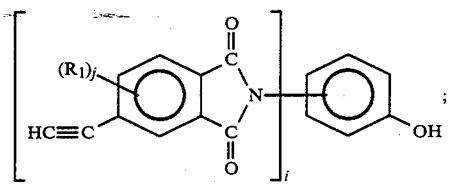

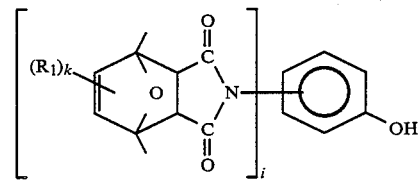

wherein
$R_1$ = lower alkyl, lower alkoxy, aryl, aryloxy, substituted aryl, halogen, or mixtures thereof;
j = 0, 1, or 2;
i = 1 or 2;
G = —CH$_2$—, —O—, —S—, or —SO$_2$—; and
k = 1 or 2;
wherein the dihalogen moiety is selected from the group consisting of:

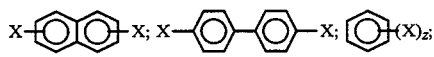

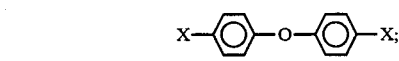

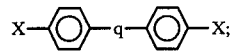

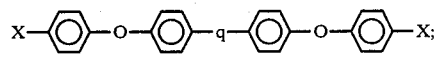

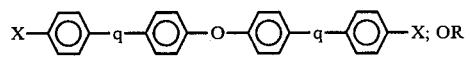

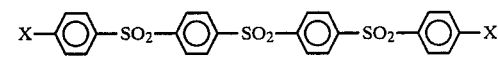

wherein
X = halogen, preferably chlorine; and
q = —S—, —SO$_2$—, —CO—, —(CH$_3$)$_2$C—, and —(CF$_3$)$_2$C—; and
and wherein the diol is selected from the group consisting of:

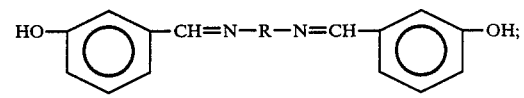

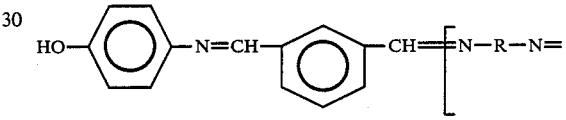

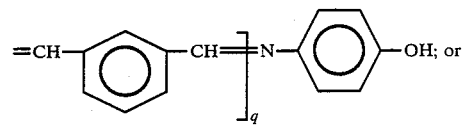

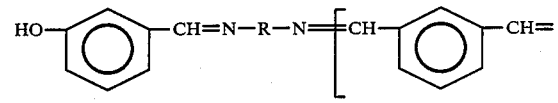

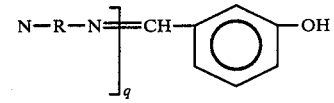

wherein R is selected from the group consisting of:
phenyl;
biphenyl;
naphthyl; or
a compound of the general formula:

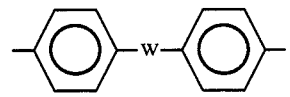

wherein
W = —CH$_2$— or —SO$_2$—; and
q = a small integer;
wherein n = an integer such that the oligomer has a formula weight between about 1,000 and 40,000;

the reaction occurring under an inert atmosphere in the presence of excess base; and (b) a suitable amount of a suitable dopant.

7. The oligomer of claim 6 wherein the end cap imidophenol is selected from the group consisting of:

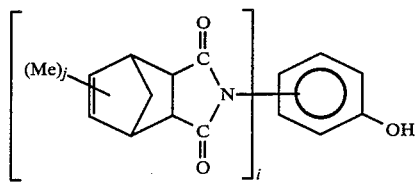

or

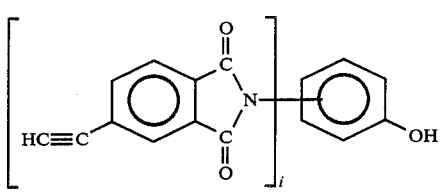

8. The product of claim 6 wherein the dihalogen is selected from the group consisting of:

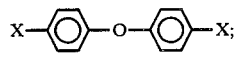

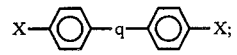

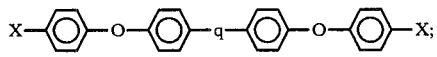

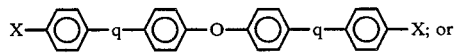

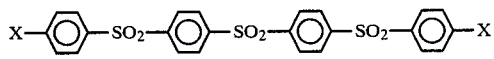

9. The method of claim 3 comprising the substeps of:
(a) mixing the imidophenol and diol to form a premix; and
(b) adding the premix to the dihalogen moiety.

10. The oligomer of claim 6 wherein the base is selected from the group consisting of $K_2CO_3$, $Na_2CO_3$, KOH, NaOH, or mixtures thereof.

11. The oligomer of claim 6 wherein i=2.

12. The oligomer of claim 8 wherein i=2.

13. The oligomer of claim 6 further comprising a coreactant selected from the group consisting of:

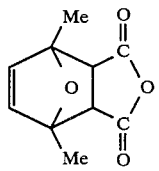

and

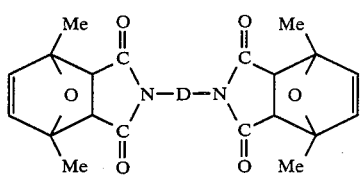

or similar compounds analogous to the oligomer imidophenol end cap, where D is an alkyl having 2 to 6 carbon atoms or an aromatic radical such as:

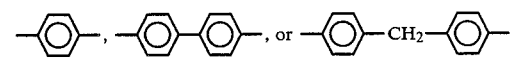

14. The method of claim 1 wherein the condensation occurs in a suitable solvent.

15. The method of claim 9 further comprising the step of dissolving the dihalogen in a suitable solvent prior to adding the premix.

* * * * *